(12) United States Patent
Baldischweiler et al.

(10) Patent No.: US 6,202,176 B1
(45) Date of Patent: Mar. 13, 2001

(54) METHOD OF MONITORING THE CORRECT EXECUTION OF SOFTWARE PROGRAMS

(75) Inventors: Michael Baldischweiler, München; Stefan Pfab, Grosshesselohe, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/354,132

(22) Filed: Jul. 15, 1999

(30) Foreign Application Priority Data

Jan. 15, 1997 (DE) ............................................. 197 01 166

(51) Int. Cl.$^7$ ............................. H02H 3/05; G11C 29/00; G06F 15/00; G06F 12/00
(52) U.S. Cl. ............................. 714/38; 714/39; 714/702; 711/152; 712/234
(58) Field of Search .............................. 714/38, 39, 702; 711/152; 712/234

(56) References Cited

U.S. PATENT DOCUMENTS

| 4,296,404 | * | 10/1981 | Sheldon | 340/149 A |
| 5,274,817 | | 12/1993 | Stahl | 395/700 |
| 5,349,655 | | 9/1994 | Mann | 395/575 |
| 5,978,915 | * | 11/1999 | Lisart et al. | 713/200 |
| 6,076,149 | * | 6/2000 | Usami et al. | 711/163 |

FOREIGN PATENT DOCUMENTS

| 4315732 C1 | 6/1994 | (DE) . |
| 19614904 A1 | 10/1997 | (DE) . |
| 0010186 A1 | 4/1980 | (EP) . |
| 0011136 A1 | 5/1980 | (EP) . |

OTHER PUBLICATIONS

"Compiler Assisted Self–Checking of Structural Integrity Using Return Address Hashing", Uwe Wildner, XP–002068242, pp. 161–177.

Japanese Patent Abstract No. 2–304365 (Sakai), dated Dec. 18, 1990.

Japanese Patent Abstract No. 3–223938 (Kamigaki), dated Oct. 2, 1991.

Japanese Patent Abstract No. 62–28836 (Fujimori), dated Feb. 2, 1987.

* cited by examiner

*Primary Examiner*—Norman M. Wright
(74) *Attorney, Agent, or Firm*—Herbert L. Lerner; Laurence A. Greenberg; Werner H. Stemer

(57) ABSTRACT

The method described is distinguished in that overwriting return addresses stored for later use and/or using incorrectly stored or overwritten return addresses as a return address are prevented. This further prevents deliberate manipulation of program execution of software programs.

10 Claims, 1 Drawing Sheet

METHOD OF MONITORING THE CORRECT EXECUTION OF SOFTWARE PROGRAMS

CROSS-REFERENCE TO RELATED APPLICATION

This is a continuation of copending International Application PCT/DE98/00133, filed Jan. 15, 1998, which designated the United States.

BACKGROUND OF THE INVENTION

Field of the Invention

The present invention relates to a method for monitoring the correct execution of software programs in which the overwriting of return addresses is prevented.

The correct execution of software programs is a constant aim that is being achieved to an ever increasing extent through the provision of a wide range of measures.

Whereas, previously, unreliable hardware and programming errors were the primary causes of software programs being executed incorrectly, deliberate manipulation of program execution is now taking on an ever greater significance.

Deliberate manipulation of program execution means that it is possible, for example, to skip particular program parts, which allows checks establishing access authorization to be bypassed, for example.

This may become a serious problem in smart cards, to quote a by no means exclusive example, because, on the one hand, such cards are becoming more and more widespread in security-related areas (for example for access checks, monetary transactions etc.), in particular, and, on the other hand, they can readily be made a target for attempts at manipulation, owing to the fact that it is naturally impossible for them to be constantly monitored or supervised.

A multiplicity of security precautions already built into the smart card results in a very slim chance of a successful improper manipulation. Nevertheless, improper manipulations cannot be entirely eliminated.

The present invention is therefore based on the object of finding a method of monitoring the correct execution of software programs, by use of which, in particular, deliberate manipulation of program execution can be largely eliminated.

SUMMARY OF THE INVENTION

It is accordingly an object of the invention to provide a method of monitoring the correct execution of software programs which overcomes the above-mentioned disadvantages of the prior art methods of this general type.

With the foregoing and other objects in view there is provided, in accordance with the invention, a method of monitoring a correct execution of software programs, which includes:

providing a safeguard memory, the safeguard memory being a memory that cannot be deliberately addressed from outside a system executing a software program being monitored; and preventing an overwriting of return addresses stored for later use and preventing a use of incorrectly stored return addresses and incorrectly overwritten return addresses as a return address, by protecting the return addresses from being overwritten and from being used by evaluating safeguard information generated when the return addresses are stored and storing the safeguard information in the safeguard memory.

Accordingly, the invention provides that overwriting return addresses stored for later use and/or using incorrectly stored or overwritten return addresses as a return address are prevented.

The method steps can be implemented, in practical terms, in a wide variety of ways. In the simplest case, when a function or the like is called that requires the return address to be stored, not only the return address itself but also additional safeguard information is stored which makes it possible to recognize whether the stored return address is still required and therefore must not be overwritten and/or whether the stored return address is the return address originally stored or to be stored.

In the former case, i.e. when return-address overwrite protection is implemented, the safeguard information may contain a write-protection identifier, for example, such as a write-protection bit or the like which is set when a return address is stored and is reset after the stored return address has been used as a return address.

In the second case mentioned, i.e. when return-address use protection is implemented, the safeguard information can contain, by way of example, the return address itself or data which represents or characterizes the return address in another way.

The safeguard information is stored in a memory area that preferably cannot be accessed externally; "normal" storage of the return addresses can, as previously, be in the so-called stack.

If a check is run, before every attempt at writing to the stack, to determine whether the area to be written to is identified by the write-protection bit as being a write-protected area, then it is possible to prevent overwriting data that is to be used later as a return address.

If, alternatively or in addition, a check is run to determine whether data that is to be used as a return address corresponds to the return address originally stored or to be stored, then it is possible to prevent data that has been changed (manipulated) after the return address was stored from being used as a return address.

In both cases, in order to prevent further attempts at manipulation, the program currently being executed can be terminated and/or the system executing the program can be reset and/or an alarm can be triggered and/or security-related data can be deleted and/or other protective measures can be taken.

This can be used to ensure that deliberate manipulation of return addresses cannot result in the correct execution of a program from being changed.

A method has therefore been found which further prevents attempts at deliberate manipulations of program executions.

Other features which are considered as characteristic for the invention are set forth in the appended claims.

Although the invention is illustrated and described herein as embodied in a method of monitoring the correct execution of software programs, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
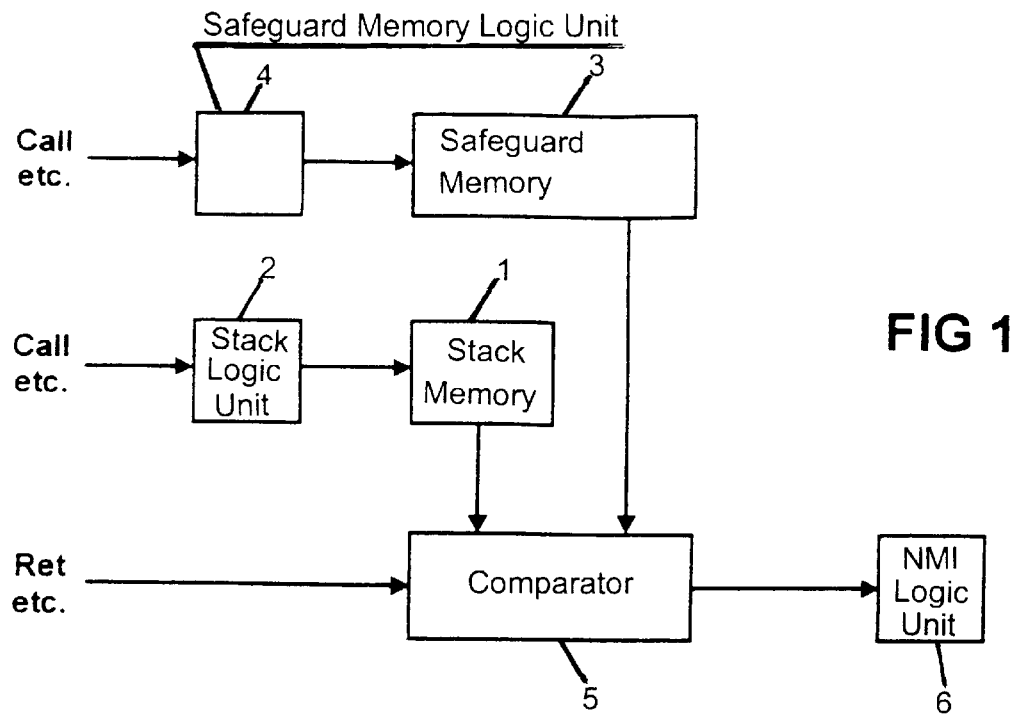
FIG. 1 is a diagrammatic, block diagram of a system for providing return-address use protection according to the invention.

In all the figures of the drawing, sub-features and integral parts that correspond to one another bear the same reference symbol in each case. Referring now to the figures of the drawing in detail and first, particularly, to FIG. 1 thereof, there is shown partially a system which is configured for executing software programs and can be contained, wholly or in part, in a microprocessor, a microcontroller, a signal processor or the like.

The section shown is that part of the system that is relevant for handling return addresses.

Return addresses need to be stored, for example, if the program to be executed contains a function call. When a function is called (for example in the case of the LCALL command in the Intel 8051 microcontroller) the following steps occur:

an address jump is made, within a program memory, to a location storing a program for the function which is now to be executed;

the relevant function program is executed; and program execution returns to the location in the program memory from where the jump to the function program was made.

The last-mentioned address, i.e. the address at which the program execution is to be continued after execution of the function program, is the aforementioned return address.

In order that the device executing the software program knows where to jump to after the execution of the function, temporary storage of the return address is necessary.

It should be pointed out at this juncture that function calls are not the only events that require the return address to be stored. Storage of the return address is, to quote just a few examples, also necessary in the case of interrupts or when changing task in multi-tasking operating systems.

The return addresses are usually stored in a so-called stack or stack memory. Such a stack is denoted by the reference numeral 1 in FIG. 1. The stack 1 is driven or controlled by a stack logic unit 2. The stack logic unit 2 produces, among other things, a so-called stack pointer, which points to that sub-area of the stack 1 that is to be written to or read next. Stacks per se and how they are used are known generally, so that a further explanation can be dispensed with here.

The stack 1 can store not only return addresses but also any other desired data (register contents, local variables etc.). However, the present explanation essentially relates exclusively to the handling of return addresses.

If, for example in the case of an LCALL command, a return address is to be stored in the stack 1, then this is dealt with by the stack logic unit 2.

In contrast to conventional systems, the return address stored or to be stored in the stack 1 in the system under consideration here is additionally stored as safeguard information in a further memory. This memory, called a safeguard memory below, is denoted by the reference numeral 3 in FIG. 1. The safeguard memory 3 is allocated a safeguard-memory logic unit 4 by which it is driven or managed in a similar way to the stack logic unit 2 driving or managing the stack 1.

In contrast to the stack 1, the safeguard memory 3 cannot be addressed from outside the system executing the software program. Therefore, data written to it cannot be deliberately manipulated, or at any rate not with a reasonable amount of effort.

In the example considered, the safeguard-memory logic unit 4 reacts, in contrast to the stack logic unit 2, only if a return address is to be written or read. Alternatively, however, it is naturally also possible to provide for the safeguard-memory logic unit 4 to react to other events (apart from externally prompted write and read procedures) as well.

If the program execution has reached a point at which a return is to be made to a previously stored return address, for example in the case of a RET (return) command, then the required return address can be obtained by reading the stack 1 accordingly. However, before the data received in this process is used as a return address, a check is run to determine whether the data received is identical to the return address stored in the safeguard memory 3 as safeguard information.

To this end, a comparator 5 is provided which receives the data to be compared with one another from the stack 1 and the safeguard memory 3 and compares them.

If the comparison performed in the comparator 5 establishes that the data compared with one another are identical, the data received from the stack 1 corresponds to the return address originally stored, i.e. it has neither been manipulated nor stored or read incorrectly or at or from the wrong location as a result of a hardware and/or software error. Accordingly, the data stored in the stack 1 can be regarded and used as the correct return address. This conclusion can be drawn because, as already mentioned above, it is practically impossible to influence the content of the safeguard memory 3 deliberately.

If, on the other hand, the comparison performed in the comparator 5 establishes that the data compared with one another are not identical, it is highly probable that the data received from the stack 1 has either been manipulated or stored or read incorrectly or at or from the wrong location as a result of a hardware and/or software error. Irrespective of the cause of the lack of a match, the data stored in the stack 1 cannot be used as a return address, because this would result in a departure from correct program execution. In this case, the comparator 5 produces a signal NMI that is supplied to an NMI logic unit 6. The NMI logic unit 6 causes the program to be immediately terminated and/or the system processing the software program to be reset and/or an alarm to be triggered and/or security-related data to be deleted.

In the example considered, the comparator 5 is activated by commands which, as with the example of the RET command, result in data which is to be interpreted as a return address being read from the stack 1. At all other times, the comparator 5 is inactive.

The measures described can ensure that the software program to be executed can be executed only when and if no return address error, whatever the cause, is detected.

The example described with reference to FIG. 1 can be regarded as the practical implementation of return-address use protection that reacts as required.

Although this is not described in more detail with the aid of examples, it is not absolutely necessary here for the safeguard information allocated to the respective return addresses to be the return addresses themselves. Alternatively, provision may be made for only selected parts of the return address or data that represents or characterizes the return address in any other desired manner to be used as safeguard information. The comparator 5 would then of course possibly need to be replaced with a comparison device modified in accordance with the given circumstances.

An alternative way of implementing the desired program-execution monitoring is return-address overwrite protection, which will now be described with reference to FIG. 2.

Figure 2:
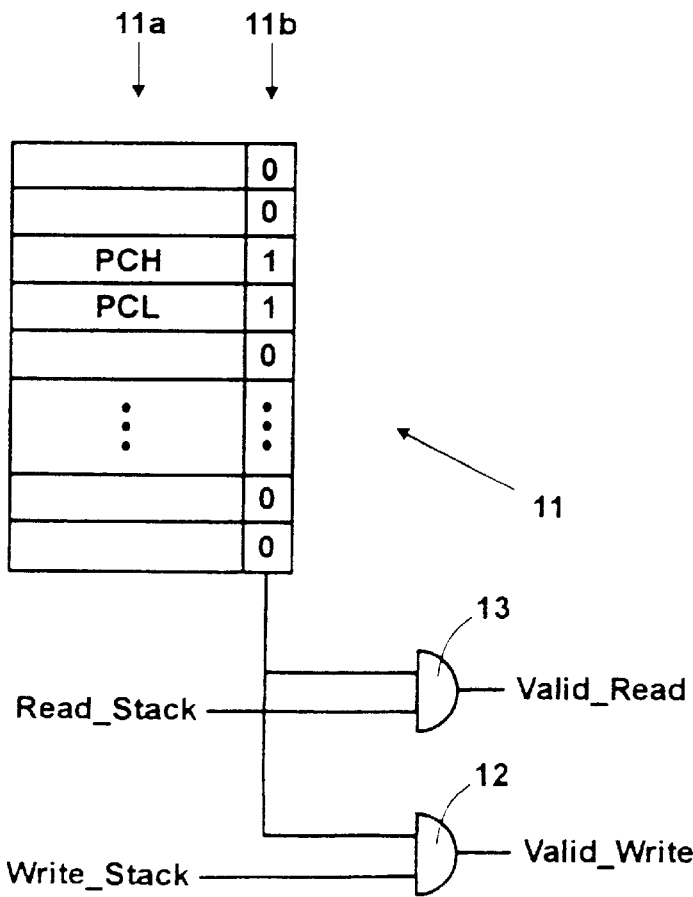
FIG. 2 is a circuit diagram explaining return-address overwrite protection and modified return-address use protection.

FIG. 2 shows, among other things, a memory 11 that can be divided into a first memory area in the form of a stack 11a, and a second memory area in the form of a safeguard memory 11b.

The stack 11a corresponds to the stack 1 shown in FIG. 1. The safeguard memory 11b corresponds roughly to the safeguard memory 3 shown in FIG. 1; however, the safeguard memory 11b has different safeguard information written to it than is the case with the safeguard memory 3.

Like the safeguard memory 3, the safeguard memory 11b also cannot be addressed from outside the device executing the software program to be monitored. Therefore, in this variant of program-execution monitoring as well, information stored in the safeguard memory 11b cannot be manipulated, or at any rate not with a reasonable amount of effort.

The safeguard information stored in the safeguard memory 11b contains a write-protection bit which is set to "1" if the content of the associated stack area must not be overwritten and is set to "0" if the content of the associated stack area may be overwritten.

If, as in the case of the LCALL command, for example, a return address is to be stored in the stack 11a, then this is dealt with in the usual manner.

At the same time, a "1" is written to that area of the safeguard memory 11b which is allocated to the stack area to which the return address was written, so as thereby to indicate that the corresponding stack area must not be overwritten.

In the example considered, the stack 11a is supposedly divided into areas each containing 8 bits, each of the 8-bit areas being allocated a write-protection bit stored in the safeguard memory 11b. Assuming that 16-bit addresses are used, two stack areas are required for storing a return address.

As shown in the illustration in FIG. 2, the return address is stored in the stack 11a. The return address is composed of a part (PCH) containing the eight most significant bits and a part (PCL) containing the eight least significant bits. Both the stack area containing PCH and the stack area containing PCL are allocated "1" as the safeguard information or write-protection bit.

The respective safeguard information or write-protection bits are reset to "0" if the data stored in the associated stack area has been used as a return address.

Before every attempt to write data to the stack 11a (to overwrite data stored there), the safeguard information associated with the stack area that is to be written to (the associated write-protection bit) is evaluated to determine whether it is permissible to write to the stack 11a at this location.

If the associated safeguard information or the associated write-protection bit has the value "1", then it is not permissible to write to the stack 11a at this location; the write attempt is recognized as an attempt at manipulation or as a hardware or software error. On the other hand, if the associated safeguard information or the associated write-protection bit has the value "0", then it is permissible to write to the stack 11a at this location.

The decision regarding the permissibility of writing to a particular stack area is checked by a write-protection checking circuit, which is an AND gate 12 in the example considered. The input signals used for the AND gate 12 are a write-protection bit associated with the stack area that is to be written to and a Write_Stack signal that indicates a write request, where Write_Stack may assume the value "1" when there is a write request and where Write_Stack may assume the value "0" when there is no write request. The Valid_Write output signal from the AND gate 12 then indicates whether the intended writing to the relevant stack area is permissible (Valid_Write="0") or whether it is not permissible (Valid_Write="1"). The Valid_Write output signal from the AND gate 12 can, like the NMI output signal from the comparator 5 in FIG. 1, be used to terminate the program immediately and/or reset the system processing the program and/or trigger an alarm and/or delete security-related data.

In addition to this return-address overwrite protection, the system shown in FIG. 2 can integrate return-address use protection modified in comparison with the configuration shown in FIG. 1. The additional protection mechanism involves checking data read from the stack 11a, before it is used as the return address, to determine whether it represents the return address at all. This can be established from the safeguard information or write-protection bits associated with the respective stack areas. Only if the safeguard information or write-protection bits associated with the stack area that is to be read have the value "1" does the data stored in the corresponding stack area represent the return address. A prerequisite for this is then naturally that the safeguard information or write-protection bits are set to "1" exclusively for data which represents return addresses, that is to say, for example, data written to the stack 11a following the LCALL command or the like.

The additional protection mechanism is implemented using an AND gate 13 as shown in the illustration in FIG. 2. The input signals used for the AND gate 13 are the write-protection bit associated with the stack area that is to be read and a Read_Stack signal that indicates the intended use of the data that is being read, where Read_Stack may assume the value "1" when the data is to be used as the return address, such as when there is a RET command, and where Read_Stack may assume the value "0" when there is another intended use. The Valid_Read output signal from the AND gate 13 then indicates whether it is permissible for the requested data to be used as a return address (Valid_Read="1") or whether it is not permissible (Valid_Read="0"). If, when the return address request is made, the use of the data requested from the stack 11a as the return address were to be classified as not permissible by Valid_Read="0", then this can be interpreted as an attempt at manipulation or as a hardware or software error and can be taken as a basis for initiating suitable protection measures. The measures can include, in particular, immediately terminating the program and/or resetting the system processing the software program and/or triggering an alarm and/or deleting security-related data.

As described above, the safeguard information protected against external access contains the write-protection bit. It goes without saying that this can be replaced with an identifier which contains as many bits as required, having any desired meaning, and which can be used to provide special treatment not only for return addresses but also for any other data worth protecting in order to protect it against manipulation and errors.

The safeguard memory 3, 11b, that stores the various safeguard information, is, as already mentioned a number of times above, a memory which cannot be deliberately addressed externally. It is preferably housed in the device executing the software program to be monitored, that is to say generally a microprocessor, a microcontroller or a signal processor itself; this provides it with particularly good protection against external access. It is a relatively simple matter to produce a memory that cannot be addressed externally within the microprocessor, the microcontroller or the signal processor (e.g. in the form of a hidden or shadow stack). This simply requires an appropriate modification to the kernel software.

The use of one of the methods described above requires no further changes to the hardware or software. In particular, the stack 1, 11a can continue to be used as previously.

A method of monitoring the correct execution of software programs has therefore been found, by use of which, in particular, deliberate manipulation of program execution, and in some cases also hardware and software errors, can be largely eliminated easily and without changing the software.

We claim:

1. A method of monitoring a correct execution of software programs, which comprises:

providing a safeguard memory, the safeguard memory being a memory that cannot be deliberately addressed from outside a system executing a software program being monitored; and preventing an overwriting of return addresses stored for later use and preventing a use of incorrectly stored return addresses and incorrectly overwritten return addresses as a return address, by protecting the return addresses from being overwritten and from being used by evaluating safeguard information generated when the return addresses are stored and storing the safeguard information in the safeguard memory.

2. The method according to claim 1, which comprises using a chip for executing the software program selected from the group consisting of microprocessors, microcontrollers, and signal processors all having a memory functioning as the safeguard memory.

3. The method according to claim 1, which comprises using one of the return address itself and data representing the return address as the safeguard information.

4. The method according to claim 3, which comprises comparing stored data with the safeguard information and permitting use of the stored data as the return address only if the safeguard information is found to characterize the stored data.

5. The method according to claim 4, which comprises performing at least one of immediately terminating the software program, resetting the system executing the software program, triggering an alarm, and deleting security-related data, if a request is made for data representing the return address and the safeguard information is found not to characterize data received in response to the request.

6. The method according to claim 1, which comprises using write-protection identifiers indicating write protection as the safeguard information stored in the safeguard memory.

7. The method according to claim 6, which comprises preventing an overwriting of memory areas identified by the write-protection identifiers as write protected.

8. The method according to claim 7, which comprises performing at least one of immediately terminating the software program, resetting the system executing the software program, triggering an alarm, and deleting security-related data, if an attempt is made to overwrite a memory area that the safeguard information has determined to be write protected.

9. The method according to claim 6, which comprises permitting a checking out of the safeguard information and using stored data as the return address only if the safeguard information is found to indicate write protection before the stored data is used as the return address.

10. The method according to claim 9, which comprises performing at least one of immediately terminating the software program, resetting the system executing the software program, triggering an alarm, and deleting security-related data, if a request is made for data representing the return address and the safeguard information is found not to indicate write protection.

* * * * *